United States Patent [19]

Manabe

[11] Patent Number: 5,467,225
[45] Date of Patent: Nov. 14, 1995

[54] OBJECTIVE LENS FOR AN OPTICAL DISK DRIVE

[75] Inventor: Yuji Manabe, Kamakura, Japan

[73] Assignee: Nikon Corporation, Tokyo, Japan

[21] Appl. No.: 331,879

[22] Filed: Nov. 1, 1994

Related U.S. Application Data

[63] Continuation of Ser. No. 957,382, Oct. 7, 1992, abandoned.

[30] Foreign Application Priority Data

Oct. 11, 1991 [JP] Japan ................................. 3-292470

[51] Int. Cl.$^6$ ............................. G02B 21/02; G02B 3/02; G02B 9/04
[52] U.S. Cl. ..................... 359/661; 359/656; 359/717; 359/719; 359/793; 359/795; 359/796
[58] Field of Search ........................ 359/642, 656–661, 359/708, 713–719, 793–796

[56] References Cited

U.S. PATENT DOCUMENTS

| | | | |
|---|---|---|---|
| 4,572,623 | 2/1986 | Tanaka et al. | 359/661 |
| 4,721,373 | 1/1988 | Sugiyama | 359/796 |
| 5,173,809 | 12/1992 | Iwaki et al. | 359/708 |
| 5,204,782 | 4/1993 | Mercado et al. | 359/796 |
| 5,210,646 | 5/1993 | Hercado et al. | 359/796 |

FOREIGN PATENT DOCUMENTS 1-296210 of 1989 Japan.
3-12618 of 1991 Japan.

*Primary Examiner*—Georgia Y. Epps
*Assistant Examiner*—Evelyn A. Lester
*Attorney, Agent, or Firm*—Shapiro and Shapiro

[57] ABSTRACT

An optical lens for an optical disk drive suppresses a chromatic aberration to a sufficiently small level and attain a numerical aperture of as large as 0.55. It comprises a biconvex positive lens and a meniscus negative lens arranged in this order as viewed toward an optical disk to form a two-piece cemented lens system. The cementing surface is spherical and other surfaces are aspherical. The lenses meet the conditions of:

(1) $v_1 > 70$
(2) $n_1 > 1.55$
(3) $v_1 - v_2 > 45$
(4) $1.1 < \{-r_2/(f \cdot NA)\} < 1.5$ where $v_1$ is an Abbe's number of positive lens, $v_2$ is an Abbe's number of the negative lens, $n_1$ is a refractive index on a d line of the positive lens, $r_2$ is a radius of curvature of the cementing surface, f is a combined focal distance of an entire system and NA is a numerical aperture of the entire system.

5 Claims, 2 Drawing Sheets

SPHERICAL ABERRATION
SINE CONDITION

ASTIGMATISM

SPHERICAL
ABERRATION
SINE CONDITION

ASTIGMATISM

OBJECTIVE LENS FOR AN OPTICAL DISK DRIVE

This is a continuation of application Ser. No. 07/957,382 filed Oct. 7, 1992, now abandoned.

BACKGROUND OF THE INVENTION

1. Field of the Invention

The present invention relates to an objective lens suitable for use with an optical head of an optical disk drive such as a magneto-optical disk recording and reproducing apparatus or an optical disk reproducing apparatus.

2. Related Background Art

An objective lens for focusing a laser beam to a recording surface of an optical disk in a record mode and condensing a laser beam scattered from the recording surface of the optical disk in a reproduction mode is mounted in an optical head of an optical disk drive such as a magneto-optical disk recording and reproducing apparatus or an optical disk reproducing apparatus. Such an objective lens is required to have the following properties.

(1) Light in weight. In order to increase a response speed of focusing and tracking, it is necessary to drive the objective lens at a high speed. To this end, it is necessary to reduce the weight of the objective lens to reduce a load to a lens actuator.

(2) Small chromatic aberration. When information is to be recorded on a magneto-optical disk or write-after type optical disk, it is necessary to pulsively drive a semiconductor laser as a light source by a large amplitude from a low power to a high power. As the power changes, a wavelength of the semiconductor laser also changes. Thus, if the lens has a chromatic aberration, a focus point is shifted and a size of a spot of the laser beam on the recording surface of the optical disk increases. If the shift of the focus point is large, high quality recording is not attained. In a mark length recording method which permits higher density recording, a severe restriction for the chromatic aberration is required.

(3) Large numeral aperture (N.A.) of the lens. In order to attain high density recording, it is necessary to converge a spot diameter of the laser beam on the recording surface of the optical disk to approximately 1 μm. The numerical aperture required in a conventional lens is approximately 0.5, but as the high density is more and more required, the numerical aperture of approximately 0.55 is now required.

In order to achieve those properties, a two-piece lens system which utilizes an aspherical surface has been proposed. (For example, Japanese Laid-Open Patent Application Nos. 1-296210 and 3-12618). Those known two-piece lens systems comprise a combination of a convex lens made of a low dispersion glass and a concave lens made of high dispersion glass.

However, the prior art objective lenses whose lens data has been disclosed exhibit the numerical aperture of 0.5, which is not sufficiently large. As to the correction for the chromatic aberration, the prior art objective lenses doe not provide sufficient correction to the mark length recording method which permits the higher density recording. One of the reasons therefor is that an Abbe's number of the convex lens and the concave lens is improper. Further, where a sufficient correction for the chromatic aberration is to be made, a radius of curvature on a joint surface is too small because of a diffraction index of the convex lens is small, and a thickness of the lens cannot be sufficiently large. On the other hand, if the thickness of the lens is sufficiently large, the numerical aperture of the lens is reduced.

Thus, in the prior art objective lens for the optical disk drive, it is difficult to attain a large numerical aperture while the chromatic aberration is sufficiently suppressed.

SUMMARY OF THE INVENTION

If is an object of the present invention to provide an objective lens for an optical disk drive which attain the numerical aperture of as large as 0.55 while suppressing the chromatic aberration to a sufficiently small level.

As shown in FIG. 1, the objective lens for the optical disk drive of the present invention is a two-piece cemented lens of a biconvex positive lens $L_{11}$ and a meniscus negative lens $L_{12}$ arranged in this sequence as viewed toward an optical disk 1. The cementing surface is spherical and other surfaces are aspherical. The following conditions (1)–(3) are met:

(1) $v_1 > 70$ (2) $n_1 > 1.55$ (3) $v_1 - v_2 > 45$ where $v_1$ is an Abbe's number of the positive lens $L_{11}$, $v_2$ is an Abbe's number of the negative lens $L_{12}$, and $n_1$ is a refractive index on a d line ($\lambda = 587.6$ nm) of the positive lens $L_{11}$.

It is preferable that the following condition (4) is further met:

(4) $1.1 < \{-r_2/(f \cdot NA)\} < 1.5$ where $r_2$ is a radius of curvature of the cementing surface, f is a combined focal distance of the entire system, and NA is a numerical aperture of the entire system.

In accordance with the present invention, a difference between the Abbe's number of the positive lens and the Abbe's number of the negative lens is relatively large so that the chromatic aberration can be suppressed to a sufficiently low level. Further, since the refractive index of the positive lens is selected relatively large, the radius of curvature of the cementing surface need not be very small, and the numerical aperture of as large as 0.55 is attained while maintaining the thickness of the positive lens.

Where the ratio of the radius of curvature of the cementing surface and the numerical aperture is within the above range, both the radius of curvature and the numerical aperture may be selected relatively large.

The condition (1) represents the Abbe's number required for the positive lens $L_{11}$. If it is smaller, the dispersion in the Lens $L_{11}$ is too large and sufficient achromatization is not attained.

The condition (3) represents a difference of the Abbe's numbers of the two lenses required for the achromatization. If it is smaller, sufficient achromatization is not attained.

The condition (2) represents a requirement to assure a sufficient thickness of the positive lens $L_{11}$, that is, a requirement to assure a necessary numerical aperture. Where the positive lens $L_{11}$ is to have a refraction power necessary for the achromatization, the radius of curvature of the cementing surface is too small if glass having a smaller refractive index than the condition (2) is used and a sufficient thickness of the positive lens $L_{11}$ is not assured and the necessary numerical aperture is not assured.

As the difference between the refractive indices of the positive lens $L_{11}$ and the negative lens $L_{12}$ increases, the spherical aberration generated on the cementing surface increases very much. Since other two aspherical surfaces are combined to correct the spherical aberration, a precision required for centering becomes severer if the aberration is too much. In the currently available optical glass, if the condition (3) is to be met, the refractive index on the d line of the glass used for the negative lens $L_{12}$ is approximately 1.8, which is fairly large. Thus, when the glass having a smaller refractive index than the condition (2) is used, the refractive index difference is too large, which causes a large spherical aberration and requires a severe manufacturing tolerance in the centering.

An effect when the condition (4) is met is explained below. When it is met, the condition (2) and the condition (4) are combined to further correct the chromatic aberration so that a sufficient thickness is assured. Namely, a larger numerical aperture may be assured.

The condition (4) means that the ratio of the absolute value of the radius of curvature r of the cementing surface and the numerical aperture is larger than 1.1f. Thus, both the absolute value of the radius of curvature $r_2$ and the numerical aperture may be selected relatively large. Accordingly, a sufficient thickness is assured while a large numerical aperture is maintained. If glass material having a smaller refractive index than the condition (2) is used to give more sufficient refraction power required for the achromatization to the positive lens $L_{11}$, the absolute value of the radius of curvature $r_2$ m of the cementing surface will be too small and cannot exceed the lower limit of the condition (4).

On the other hand, even if the condition (2) is met, the correction of the chromatic aberration is insufficient if the upper limit of the condition (4) is exceeded.

DETAILED DESCRIPTION OF THE PREFERRED EMBODIMENTS

A preferred embodiment of the objective lens for the optical disk drive of the present invention is now explained with reference to the drawings. In the present embodiment, the present invention is embodied in an objective lens for recording and reproducing information from a polycarbonate (PC) optical disk operated at a wavelength of 830 nm and having a thickness of 1.2 mm.

In the present embodiment, the surface number i (i=1, 2, 3) is assigned in the direction toward the optical disk, and parameters representing the optical system are defined as follows:

$R_i$: Radius of curvature of the i-th surface (If it is aspherical, a radius of curvature at an apex of the aspherical surface)

$d_i$: surface-to-surface distance on an optical axis between the i-th plane and the (i+1)th plane $n_{di}$: Refractive index for d line of medium between the i-th surface and the (i+1)th surface $v_{di}$: Abbe's number of medium between the i-th surface and the (i+1)th surface (Abbe's number of air $v_{di}$ is shown by a space)

W.D.: Working distance between the objective lens and the surface of the optical disk, that is, surface-to-surface distance $d_3$ $\Delta$W.D.: Change in the working distance W.D. when the wavelength changes by 1 nm, that is, a kind of chromatic aberration In the present embodiment, the aspherical shape is represented by the following function:

$$x = Cy^2/[1+\{1-(1+\kappa)C^2y^2\}^{1/2}] + C_4 y^4 + C_6 y^6 + C_8 y^8 + C_{10} y^{10}$$

where y: Height from the x-axis x: Distance from a contact plane of an apex of an aspherical surface to a height y above the aspherical surface C: Radius of curvature at the apex of the aspherical surface $\kappa$: Cone constant $C_4$, $C_6$, $C_8$ and $C_{10}$: Aspherical surface constants

FIRST EMBODIMENT

Figure 1:
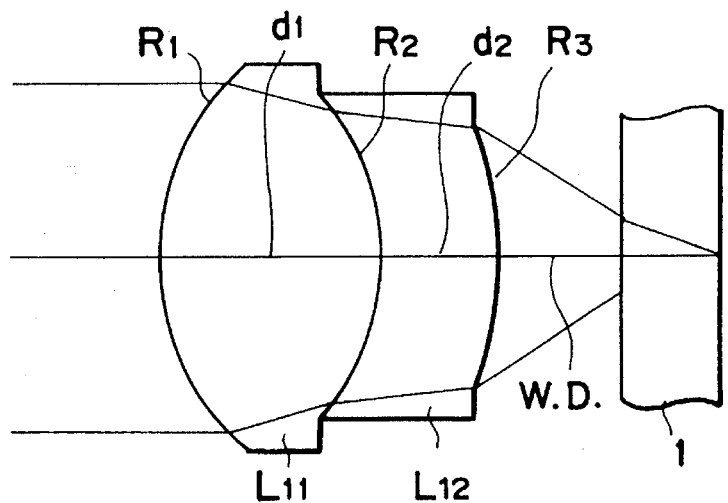
FIG. 1 shows a light path in a first embodiment of an objective lens for an optical disk drive of the present invention.
Figure 2A:
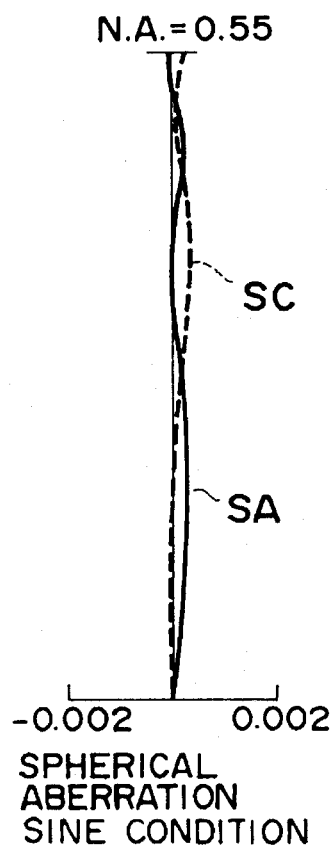
FIGS. 2A and 2B show aberrations in the first embodiment.
Figure 2B:
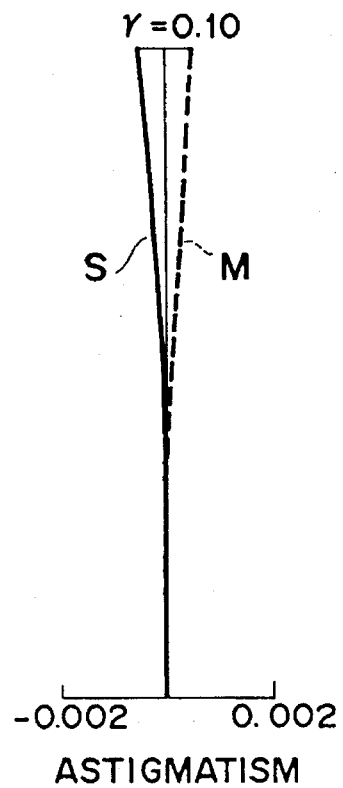

FIG. 1 shows a light path in the first embodiment, and FIGS. 2A and 2B show aberrations in the first embodiment. In FIG. 1, numeral 1 denotes a polycarbonate optical disk having a thickness of 1.2 mm. A biconvex positive lens $L_{11}$ and a meniscus negative lens $L_{12}$ having a convex surface thereof faced to the optical disk 1 are arranged in this order as viewed toward the optical disk 1, and the positive lens $L_{11}$ and the negative lens $L_{12}$ are cemented. The cementing surface (second surface) is spherical and first and third surfaces are aspherical.

In FIG. 1, in a record mode to the optical disk 1, a laser beam collimated by a collimator lens (not shown) is directed to the first surface of the present objective lens, and the light beam emitted from the third surface is focused to a spot on the recording plane of the optical disk 1. On the other hand, in the reproduction mode from the optical disk 1, the dispersion light reflected by the recording plane of the optical disk 1 is directed to the third surface of the objective lens, and the laser beam emitted from the first surface as the collimated light beam is directed to a reproducing optical system (not shown). In the embodiment of FIG. 1, the radius of curvature $R_i$, the surface-to-surface distance di, the refractive index $n_{di}$ and the Abbe's number $v_{di}$ are set as follows.

| i | $R_i$ | $d_i$ | $n_{di}$ | $v_{di}$ |
|---|---|---|---|---|
| 1 | 2.97051 | 2.70 | 1.56907 | 71.3 |
| 2 | −3.10000 | 1.50 | 1.86074 | 23.0 |
| 3 | −3.95291 | — | 1.00000 | |

The aspherical shapes of the first surface (i=1) and the third surface (i=3) are set as follows:

| | First Surface | Third Surface |
|---|---|---|
| K | 0.0899 | −2.9209 |
| C | 0.33664 | −0.25298 |
| $C_4$ | −2.80514 × 10⁻³ | 5.19092 × 10⁻³ |
| $C_6$ | −2.29704 × 10⁻⁴ | −2.11158 × 10⁻³ |
| $C_8$ | −2.19509 × 10⁻⁵ | 3.72555 × 10⁻⁴ |

-continued

|  | First Surface | Third Surface |
| --- | --- | --- |
| $C_{10}$ | $-3.08093 \times 10^{-6}$ | $-2.95072 \times 10^{-5}$ |

In the first embodiment, the focal distance f of the entire system is 4.00 mm, the N.A. is 0.55, the working distance W.D. is 1.5 mm, and the change ΔW.D. of the working distance W.D. corresponding to the chromatic aberration is 0.028 μm per nm. In the present embodiment, $-R_2/(f \cdot N.A.) = 1.409$, which meets $1.1 < -R_2/(f \cdot N.A.) < 1.5$. As seen from FIG. 2, in the present embodiment, the aberrations are well corrected while the N.A. is 0.55.

In the currently available semiconductor laser, when the laser beam is pulsively turned on in the record mode to the optical disk 1, the wavelength varies by, for example, 5–10 nm. In the present embodiment, however, since the change in the working distance W.D. is 0.28 μm at most, the shift of the focus position is a practically negligible one.

SECOND EMBODIMENT

Figure 3:
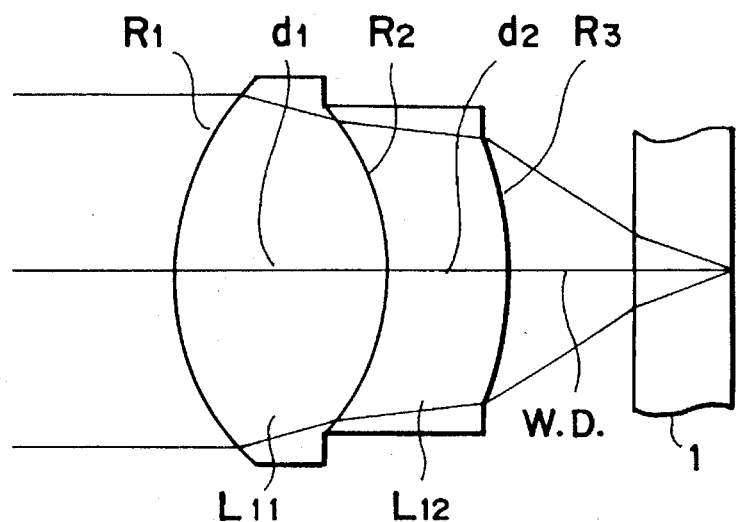
FIG. 3 shows a light path in a second embodiment of the present invention.
Figure 4A:
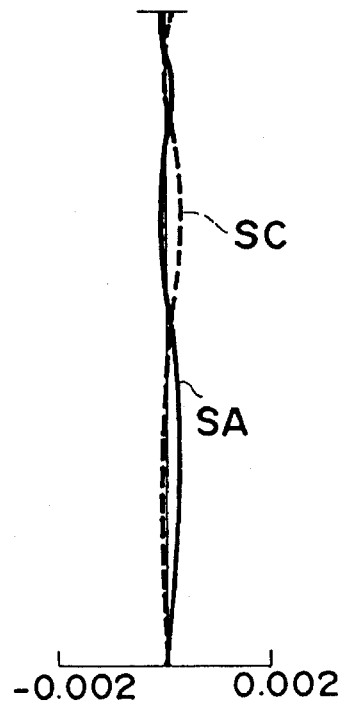
FIGS. 4A and 4B show aberrations in the second embodiment.
Figure 4B:
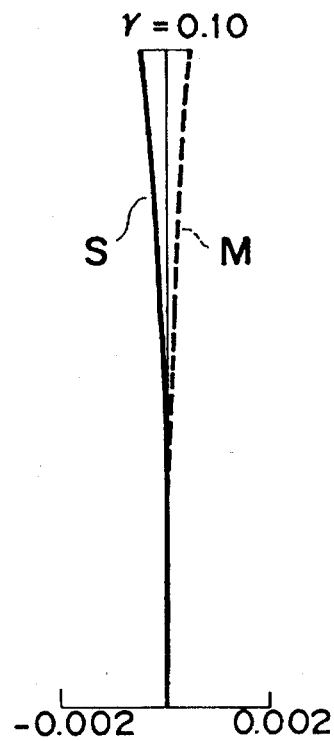

FIG. 3 shows a light path of a second embodiment, and FIGS. 4A and 4B show aberrations in the second embodiment. In FIG. 3, numeral 1 denotes a polycarbonate optical disk having a thickness of 1.2 mm. A biconvex positive lens $L_{11}$ and a meniscus negative lens $L_{12}$ having a convex surface thereof faced to the optical disk 1 are arranged in this order as viewed toward the optical disk 1. The positive lens $L_{11}$ and the negative lens $L_{12}$ are cemented. The cementing surface (second surface) is spherical and first and third surfaces are aspherical. In the embodiment of FIG. 3, the radius of curvature $R_1$, the surface-to-surface distance $d_i$, the refractive index $n_{di}$ and the Abbe's number $v_{di}$ are set as follows:

| i | $R_i$ | $d_i$ | $n_{di}$ | $v_{di}$ |
| --- | --- | --- | --- | --- |
| 1 | 3.02113 | 2.70 | 1.56907 | 71.3 |
| 2 | -3.00000 | 1.50 | 1.81786 | 23.7 |
| 3 | -3.87661 | — | 1.00000 |  |

The aspherical shapes of the first surface (i=1) and the third surface (i=3) are set as follows:

|  | First Surface | Third Surface |
| --- | --- | --- |
| K | -0.0070 | 0.1315 |
| C | 0.33100 | -0.25796 |
| $C_4$ | $1.14044 \times 10^{-2}$ | $-3.01134 \times 10^{-3}$ |
| $C_6$ | $-2.39372 \times 10^{-3}$ | $-2.59374 \times 10^{-4}$ |
| $C_8$ | $4.03264 \times 10^{-4}$ | $-1.95375 \times 10^{-5}$ |
| $C_{10}$ | $-3.02845 \times 10^{-5}$ | $-3.97403 \times 10^{-6}$ |

In the second embodiment, the focal distance f of the entire system is 4.00 mm, the N.A. is 0.55, the working distance W.D. is 1.5 mm, and ΔW.D. which represents the change in the working distance W.D. corresponding to the chromatic aberration is 0.026 μm/nm. In the present embodiment, $-R_2/(f \cdot N.A.) = 1.364$, which meets the condition of $1.1 < -R_2/(f \cdot N.A.) < 1.5$. Further, as seen from FIG. 4, the aberrations are well corrected while the N.A. is 0.55.

In the present embodiment, when the wavelength varies by 5–10 nm, the change in the working distance W.D. is 0.26 μm at most, and the shift of the focus point is practically negligible.

The present invention is not limited to the above embodiments but various modifications may be made without departing from the gist of the present invention.

What is claimed is:

1. An objective lens for an optical disk drive consisting of a biconvex positive lens and a meniscus negative lens arranged in this order as viewed toward an optical disk and cemented together, wherein the cementing surface is spherical and other surfaces are aspherical, and the lenses meet the conditions of:

(1) $v_1 > 70$
   (2) $n_1 > 1.55$
   (3) $v_1 - v_2 > 45$
   (4) $1.1 < \{-r_2/(f \cdot NA) < 1.5$ where $v_1$ is an Abbe's number of the positive lens, $v_2$ is an Abbe's number of the negative lens, $n_1$ is a refractive index on a d line of the positive lens, $r_2$ is a radius of curvature of the cementing surface, f is a combined focal distance of said objective lens and NA is a numerical aperture of said objective lens.

2. An objective lens for an optical disk drive according to claim 1 having the following data:

| i | $R_i$ | $d_i$ | $n_{di}$ | $v_{di}$ |
| --- | --- | --- | --- | --- |
| 1 | 2.97051 | 2.70 | 1.56907 | 71.3 |
| 2 | -3.10000 | 1.50 | 1.86074 | 23.0 |
| 3 | -3.95291 | — | 1.00000 |  | where i is a lens surface and $R_i$ is a radius of curvature of a lens surface in the order toward the optical disk, $d_i$ is a surface-to-surface distance, $n_{di}$ is a refractive index, $v_{di}$ is an Abbe's number, where the aspherical shapes of the first surface (i=11) and the third surface (i=3) are represented by the following equation:

$$x = Cy^2/[1 + \{1-(1+\kappa)C^2y^2\}^{1/2}] + C_4 y^4 + C_6 y^6 + C_8 y^8 + C_{10} y^{10}$$

where y: Height from the x-axis x: Distance from a contact plane of an apex of an aspherical surface to a height y above the aspherical surface C: Radius of curvature at the apex of the aspherical surface κ: Cone constant and wherein:

|  | First Surface | Third Surface |
| --- | --- | --- |
| K | 0.0899 | -2.9209 |
| C | 0.33664 | -0.25298 |
| $C_4$ | $-2.80514 \times 10^{-3}$ | $5.19092 \times 10^{-3}$ |
| $C_6$ | $-2.29704 \times 10^{-4}$ | $-2.11158 \times 10^{-3}$ |
| $C_8$ | $-219509 \times 10^{-5}$ | $3.72555 \times 10^{-4}$ |
| $C_{10}$ | $-3.08093 \times 10^{-6}$ | $-2.95072 \times 10^{-5}$ | and where f is 4.00 mm, NA is 0.55, the objective lens has a working distance W.D. of 1.5 mm, and wherein a change ΔW.D. of the working distance W.D. corresponding to chromatic aberration of the objective lens is 0.028 μm per nm.

3. An objective lens for an optical disk drive 2 according to claim 1 having the following data:

| i | $R_i$ | $d_i$ | $n_{di}$ | $v_{di}$ |
|---|---|---|---|---|
| 1 | 3.02113 | 2.70 | 1.56907 | 71.3 |
| 2 | −3.00000 | 1.50 | 1.81786 | 23.7 |
| 3 | −3.87661 | — | 1.00000 | | where i is a lens surface and $R_i$ is a radius of curvature of a lens surface in the order toward the optical disk, $d_i$ is a surface-to-surface distance, $n_{di}$ is a refractive index, $v_{di}$ is an Abbe's number, where the aspherical shapes of the first surface (i=1) and the third surface (i=3) are set as follows:

| | First Surface | Third Surface |
|---|---|---|
| K | −0.0070 | 0.1315 |
| C | 0.33100 | −0.25796 |
| $C_4$ | $1.14044 \times 10^{-2}$ | $-3.01134 \times 10^{-3}$ |
| $C_6$ | $-2.39372 \times 10^{-3}$ | $-2.59374 \times 10^{-4}$ |
| $C_8$ | $4.03264 \times 10^{-4}$ | $-1.95375 \times 10^{-5}$ |
| $C_{10}$ | $-3.02845 \times 10^{-5}$ | $-3.97403 \times 10^{-6}$ | and where f is 4.00 mm, NA is 0.55, the working distance W.D. is 1.5 mm, and the change ΔW.D. of the working distance W.D. corresponding to the chromatic aberration is 0.026 μm/nm.

4. An objective lens having a numerical aperture of substantially 0.55 for an optical disk drive, consisting of, in the order as viewed toward the optical disk, a biconvex positive lens and a negative meniscus lens convex to the optical disk, said biconvex positive lens and said negative meniscus lens being cemented together, wherein the cementing surface is spherical and other surfaces are aspherical, and the lenses meet the conditions of:

(1) $v_1 > 70$ (2) $n_1 > 1.55$ (3) $v_1 - v_2 > 45$ (4) $1.1 < \{-r_2/(f \cdot NA)\} < 1.5$ where $v_1$ is an Abbe's number of the positive lens, $v_2$ is an Abbe's number of the negative lens, $n_1$ is a refractive index on a d-line of the positive lens, $r_2$ is a radius of curvature of the cementing surface, f is a combined focal distance of said objective lens and NA is a numerical aperture of said objective lens.

5. An objective lens for an optical disk drive according to claim 4, wherein, when the wavelength used for the optical disk varies by 5–10 nm, the objective lens has a change in working distance that is 0.26 μm at most and has a shift of focus point that is practically negligible.

* * * * *